(12) United States Patent
Blanchard

(10) Patent No.: US 6,755,759 B2
(45) Date of Patent: Jun. 29, 2004

(54) SPEED TRANSMISSION FOR SELF-PROPELLED LAWNMOWER AND MOWER PROVIDED WITH SUCH A TRANSMISSION

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 56 days.

(21) Appl. No.: 10/137,422

(22) Filed: May 3, 2002

(65) Prior Publication Data
US 2002/0183145 A1 Dec. 5, 2002

(30) Foreign Application Priority Data
May 4, 2001 (FR) .............................. 01 05998

(51) Int. Cl.[7] .............................................. F16H 63/00
(52) U.S. Cl. .............................. 474/19; 474/37; 474/46
(58) Field of Search ............................. 474/17, 18, 19, 474/20, 21, 24, 46, 37

(56) References Cited

U.S. PATENT DOCUMENTS

| | | | | |
|---|---|---|---|---|
| 3,195,364 A | * | 7/1965 | Pauli ........................... 474/19 |
| 4,117,652 A | * | 10/1978 | Jones et al. ................... 56/11.8 |
| 4,327,544 A | * | 5/1982 | McDuffie et al. .............. 460/1 |
| 4,398,899 A | * | 8/1983 | Wood et al. .................... 474/37 |
| 4,592,737 A | | 6/1986 | Dhont |
| 4,835,949 A | * | 6/1989 | Seyerle ......................... 56/10.8 |
| 4,869,706 A | * | 9/1989 | Miyata et al. .................. 474/8 |
| 4,896,487 A | * | 1/1990 | Hikishima et al. ............ 56/11.8 |
| 4,907,401 A | * | 3/1990 | Nemoto et al. ............... 56/11.3 |
| 4,969,856 A | * | 11/1990 | Miyata et al. ................. 474/11 |
| 5,377,774 A | * | 1/1995 | Lohr ........................... 180/19.3 |
| 5,403,240 A | * | 4/1995 | Smith et al. .................... 474/8 |
| 5,718,105 A | * | 2/1998 | Irikura et al. ................. 56/11.4 |
| 5,778,645 A | * | 7/1998 | Irikura et al. ................. 56/11.8 |
| 5,887,484 A | * | 3/1999 | Abend et al. .................. 74/424 |

FOREIGN PATENT DOCUMENTS

| | | | | |
|---|---|---|---|---|
| FR | 2 658 892 | | 8/1991 | |
| FR | 2 774 953 | | 8/1999 | |
| GB | 833 383 | | 4/1960 | |
| JP | 62748 | * | 1/1994 | ................... 474/19 |
| JP | 6323388 | * | 11/1994 | ................... 474/17 |

* cited by examiner

Primary Examiner—David A. Bucci
Assistant Examiner—Vicky A. Johnson
(74) Attorney, Agent, or Firm—Young & Thompson (57) ABSTRACT

The invention relates to a speed transmission for a mower, in particular a lawnmower, comprising a speed changer. This transmission is characterized in that the speed changer is constituted by a transmission with a belt (5) between a drive pulley (6) mounted on the motor shaft (1) that bears the blades and a driven pulley (7) mounted on the input shaft (2) of the reducer (4), the drive pulley (6) and the driven pulley (7) each having flanges (6A, 6B) (7A, 7B) that are movable, the movement of the flanges (6A, 6B) of the drive pulley (6), ensuring continuous tensioning of the belt, being controlled automatically as a function of the couple transmitted between said pulleys by means of a member (8) for the continuous adjustment of the tension of the belt (5) while the movement of the flanges (7A, 7B) of the driven pulley (7), ensuring the speed change, is controlled manually by means of a control member (12).

20 Claims, 6 Drawing Sheets

SPEED TRANSMISSION FOR SELF-PROPELLED LAWNMOWER AND MOWER PROVIDED WITH SUCH A TRANSMISSION

BACKGROUND OF THE INVENTION

The present invention relates to a speed transmission for a mower, particularly for lawns, that is self-propelled, with a variable speed of advance.

It relates more particularly to a transmission between the primary motor shaft that carries the mowing blade, with a constant speed of rotation, of a lawnmower and the output shaft of a reducer coupled to the wheels of the mower.

The invention also relates to a mower, in particular for lawns, provided with such a transmission.

DESCRIPTION OF THE RELATED ARTS

Self-propelled lawnmowers, also called traction lawnmowers, generally have, for basic models, a constant speed of advance. For more developed models, these self-propelled lawnmowers are provided with a gearbox. There results a substantial increase in the cost of the mower accompanied by the risk of more frequent breakdown. Moreover, the design of lawnmowers, in particular the length of the blade-carrying motor shaft, at present limits the solutions to be foreseen, by reason of available space. Solutions with a transmission belt have been imagined to provide a speed variation. However, in this case, the transmissions are constituted by at least three successive pulleys, the intermediate pulley constituting a relay pulley. It is accordingly necessary to have at least two belts to ensure transmission. Because of this, the risk of breakdown is again multiplied.

There is moreover known a belt transmission with variable speed, in which the speed variation is obtained by means of a driven pulley whose flanges are controlled manually as to their spacing. In this case, such a transmission is arranged to coact with a power-driven pulley with a fixed flange, a tensioning roller ensuring the tension in the belt. This solution is more particularly described in U.S. Pat. No. 4,117,652.

There is another category of transmissions in which the drive pulley is adapted to ensure speed variation and to coact with a driven pulley.

In short, it can therefore be considered that until now there are two types of transmissions:
  a first transmission type in which the driven pulley provides for speed variation and coacts with a drive pulley with fixed flanges,
  a second transmission type in which the drive pulley ensures the variation of speed and coacts with a driven pulley with flanges that are fixed or not.

However, in the case of an application to lawnmowers, the region adjacent the blade-carrying motor shaft is a dangerous region because of the presence of a rotating blade. It is accordingly impossible to have delicate members on this motor shaft. At present, solutions are being sought that will permit the production of a transmission for self-propelled lawnmowers with variable speed of advance, at a low cost.

SUMMARY OF THE INVENTION

An object of the present invention is to provide a speed transmission for self-propelled lawnmowers with a variable speed of advance and a wide range of variation of speed, whose design is particularly simple and of reduced cost.

Another object of the present invention is to provide a transmission of the mentioned type, which permits reducing the forces exerted on the members constituting the driven pulley.

Another object of the present invention is to provide a transmission of the mentioned type, of small size and whose assembly of fragile members is disposed at a distance from the working zone of the mower blade.

Another object of the present invention is to provide a speed transmission of the mentioned type, whose control force can be moderated because it is proportional to the force produced by the drive pulley.

Another object of the present invention is to provide a transmission whose range of speed variation is wide.

To this end, the invention has for its object a speed transmission for mowers, particularly lawnmowers, that is self-propelled with a variable speed of advance, between the primary motor shaft that carries the mower blade at a constant speed of rotation and the output shaft of a reducer coupled to the wheels of the mower, this transmission having, upstream of the reducer disposed preferably within a housing, a speed changer between the primary motor shaft that carries the blade and the input shaft of the reducer, characterized in that the speed changer is constituted by a belt transmission between a drive pulley adapted to be mounted on the blade-carrying motor shaft and a driven pulley adapted to be mounted on the input shaft of the reducer, the drive pulley and the driven pulley each comprising flanges movable toward and away from each other, the movement of the flanges of the drive pulley, ensuring the permanent tension in the belt, being controlled automatically as a function of the couple transmitted between said pulleys by means of a member for the continuous adjustment of the tension of the belt, positioned adjacent this pulley, whilst the movement of the flanges of the driven pulley, ensuring speed variation, is controlled manually, by means of a control member positioned immediately adjacent the reducer to be isolated from the cutting field of the blade and to be protected from abrasive projections and fowling in the working zone.

Thanks to the design of this transmission, the control force is moderate because it is proportional to the force produced on the drive pulley and the control cable is no longer adjacent the mower blade, such that any risk of breaking this cable by the blade is avoided.

Moreover, the risk of breakdown of such a transmission, because of the presence of a single belt, is reduced without reducing the range of speed variation, which is wide.

Finally, the assembly of the members disposed on the driven pulley or receiver is not subject, because of the presence of a member for continuously adjusting the belt on the drive pulley, to forces that are too great, which limits the wear on said members.

Finally, such a design associating two variable pulleys permits obtaining a wide range of speed variations, the two pulleys taking part in this speed variation whilst being free from a tensioning roller. Moreover, the design of this transmission permits, in the absence of action on the control device of the drive pulley, obtaining a rapid speed transmission. The control device thus permits the passage of the transmission from a rapid speed to a low speed. This solution is particularly advantageous in the case of transmission for lawnmowers, because the rapid speed is the one most used. This solution results again from the positioning of the pulley ensuring speed variation.

The invention also has for its object a self-propelled lawnmower with variable speed of advance, characterized in that it comprises a transmission of the above type.

BRIEF DESCRIPTION OF THE DRAWINGS

The invention will be better understood from a reading of the following description of embodiments, with reference to the accompanying drawings, in which.

DESCRIPTION OF THE PREFERRED EMBODIMENTS

The speed transmission, according to the invention, is designed for self-propelled lawnmowers with variable forward speed. This transmission ensures a transmission between the primary motor shaft 1 that carries the mower blade of the mower and the output shaft 3 of a reducer 4. This output shaft 3 of the reducer is adapted to be coupled to the wheels of the mower. The primary shaft 1 that carries the blades 17 is itself driven in rotation at a constant speed. This speed is of the order of 3000 rpm to obtain effective mowing action. The output shaft of the reducer 4 coupled to the wheels of the mower must be driven in rotation to ensure the speed of advance of the mower comprised generally between 0 and 4 km/h. To ensure this variable speed of advance, a speed changer is dispose upstream of the reducer 4, between primary motor shaft 1 that carries the blades and input shaft 2 of the reducer 4.

Figure 1:
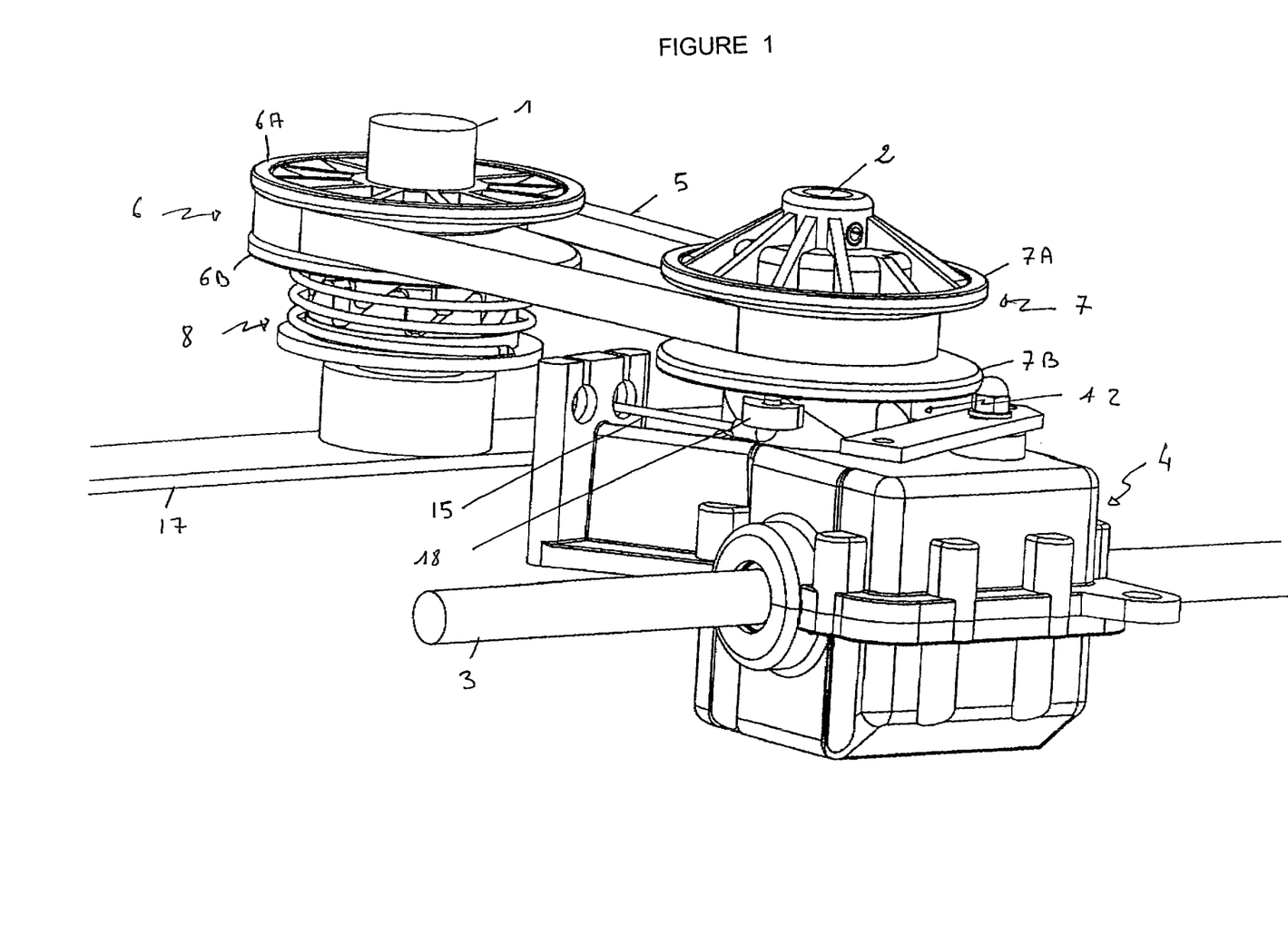
FIG. 1 is a fragmentary schematic view of a transmission according to the invention, in a position of the speed changer corresponding to high speed of rotation of the input shaft of the reducer.
Figure 2:
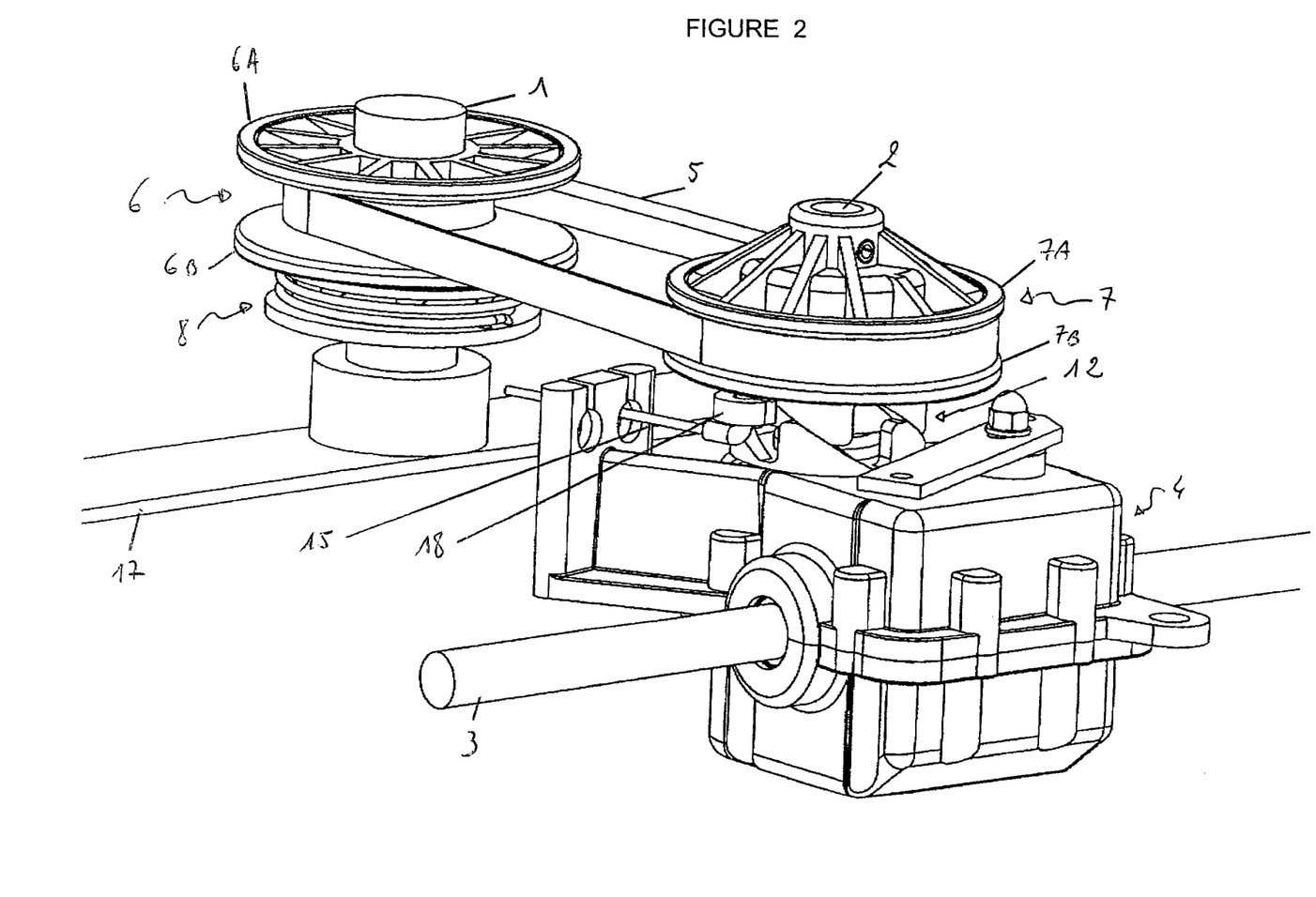
FIG. 2 is a fragmentary schematic view of a transmission according to the invention, in a position in which the input shaft of the reducer turns at a lower speed than in FIG. 1.

As shown in FIGS. 1 and 2, this speed changer is constituted by a transmission with a belt 5 between a drive pulley 6 adapted to be mounted on the motor shaft 1 that carries the blades and a driven pulley 7 adapted to be mounted on the input shaft 2 of the reducer 4. The drive pulley 6 and the driven pulley 7 each comprise flanges 6A, 6B; 7A, 7B that are movable toward and away from each other. The flanges 6A, 6B are movable axially by means of angular displacement of one of the flanges 6B because of the presence of ramps 10 which will be described hereafter.

The movement of the flanges 6A, 6B of the drive pulley 6, ensuring permanent tensioning of the belt 5, is controlled automatically as a function of the couple transmitted between said pulleys by means of a member 8 for the continuous adjustment of the tension in the belt 5, positioned adjacent this pulley 6. In the illustrated example, the member 8 for continuous adjustment of the tension in the belt 5 is mounted on the motor shaft 1. In the illustrated examples, in particular in FIG. 3, the member 8 for continuous adjustment of the tension of the belt 5 has the form of a cam constituted by two coaxial plates 9A, 9B with inclined ramps 10 in sliding contact. One of these plates, in this case plate 9A, is secured in rotation to a flange 6B of the drive pulley 6. The other plate 9B is secured to the shaft 1 that carries the blades 17. A torsion spring 11 is interposed between plates 9A, 9B that carry ramps 10, to return the plates 9A, 9B carrying the ramps 10 to the spaced position.

Figure 3:
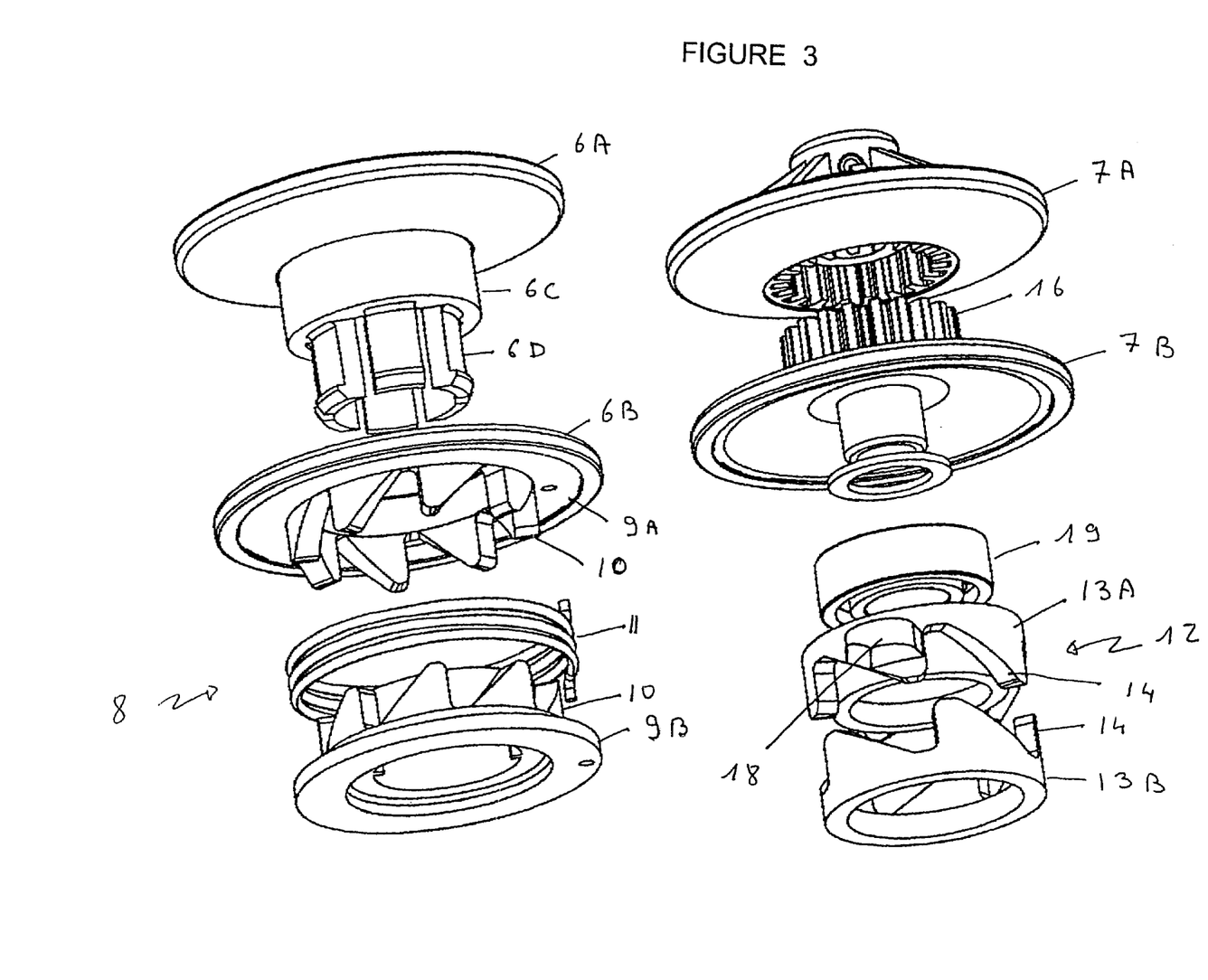
FIG. 3 is fragmentary perspective view of the elements constituting the speed changer in exploded position of the elements constituting it.

In a preferred embodiment of the invention shown in FIG. 1, the flange 6B of the drive pulley 6 and the plate 9A carrying the ramps 10 secured in rotation to the flange 6B, are made of a single piece. The flanges 6A of the drive pulley 6, not subject to the action of the member 8 for continuous adjustment of the tension of the belt 5, as shown in FIGS. 1–3, carries a hub 6C prolonged axially by resiliently deformable fingers 6D. The hub 6C receives within it the flange 6B of the pulley that carries the ramps 10, the torsion spring 11 and the ramp carrying plate 9 associated with the torsion spring 11. The free ends of the fingers 6D coact by snap-in engagement with the plate 9B that carries the ramps 10 to maintain, in the assembled condition of the hub 6C, the elements 6B, 11, 9B. This mounting is more particularly shown in FIG. 3. The snap-in can then be locked by positioning the hub 6C on the motor shaft 1. Thus, once the assembly is positioned on the motor shaft 1, the resiliently deformable fingers can no longer space and free the plate 9B carrying the ramps 10. As a result, there is a simplicity of assembly of said elements with each other.

The movement of the flanges 7A, 7B of the driven pulley 7, ensuring the variation of speed is, itself, controlled manually by means of a control member 12 positioned immediately adjacent the reducer 4. The positioning of the control member 12 on the input shaft 2 of the reducer 4 permits isolating this latter from the field of action of the blade 17 and protecting it from abrasive and clogging projections concentrated in the working zone. Thus, any risk of damage to the manual control member 12 of the speed changer is avoided.

This member 12 for manual control of the speed change, has the form of a cam constituted by two plates 13A, 13B that are coaxial, with inclined ramps 14 in sliding contact. One 13B of the plates 13A, 13B is mounted fixedly relative to the casing of the reducer 4. The other plate 13A is movable angularly about the input shaft 2 of the reducer 4, by a manual cable control 15 to adjust as desired the speed of rotation of the input shaft 2 of the reducer 4. It is to be noted that the positioning of this manual control member 12 of the speed changer on the input shaft 2 of the reducer 4 and the combination of this latter with the member 8 for continuously adjusting the tension in the belt 5 positioned on the motor shaft 1, permits reducing the control force applied to this control member 12. In the example shown in FIG. 1, the plate 13B carrying the ramps 14, mounted fixedly relative to the facing of the reducer 4, is constituted by a wall of the casing of the reducer 4 and forms a monolithic assembly with this latter. As a result, there is a reduction in the number of pieces to be used. Moreover, the plate 13 carrying the ramps 14 of the member 12 for controlling the speed changer, angularly displaceable about the input shaft 2 or reducer 4, comprises, on the external surface of one of its ramps 14, a radial ear 18 within which is fixed an end of the control cable 15. This control cable 15 is sufficiently rigid to permit, during traction on this cable 15, an angular displacement corresponding to the plate 13A. This displacement gives rise to spacing of the plates 13A, 13B which results in an axial force on the plate 7B which thus tends to move it toward the flange 7A of the driven pulley. This axial force between the cam and the pulley is transmitted by means of a roller bearing 19 disposed between the flange 7B and the plate 13A.

Finally, the driven pulley 7 is made such that the flanges 7A, 7B are coupled by means of channels 16 permitting relative axial displacement of the flanges 7A, 7B whilst holding them together in rotation. These channels are respectively provided in the central recess of the flange 7A and on a central hub of the flange 7B that comes to be disposed within the recess of the flange 7A.

Figure 4:
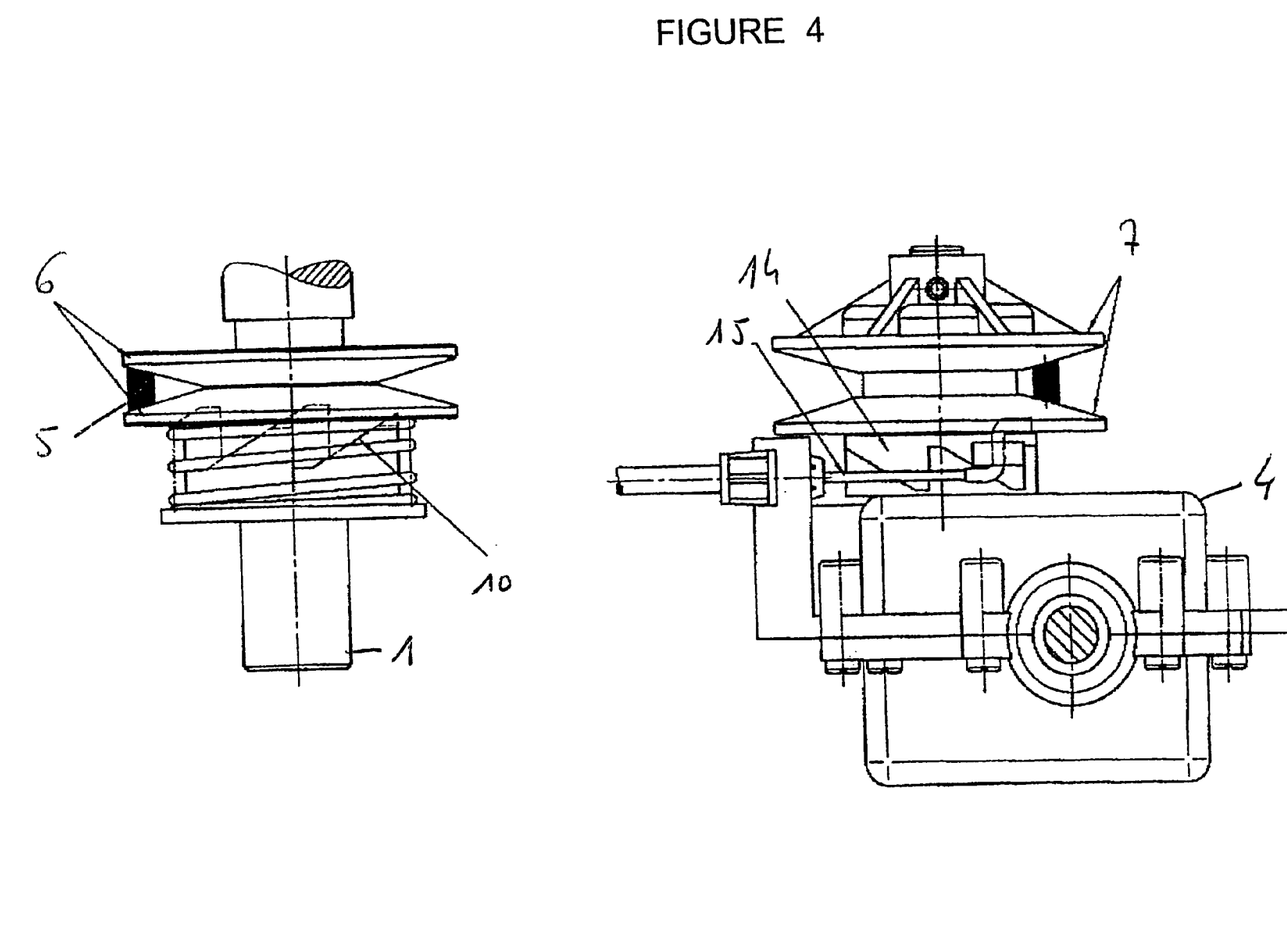
FIGS. 4 to 6 are fragmentary schematic views of a transmission in positions corresponding to different speeds of rotation of the input shaft of the reducer.

The speed changer described above operates in the following manner. When the control cable 15 is released, the ramps 14 for controlling the member 12 for adjusting the speed variation are in a position near each other as shown in FIG. 4. Because of this, the flanges 7A, 7B of the driven pulley are in the spaced position and the belt 5 thus passes over the smallest diameter of the driven pulley 7. On the motor side, the ramps 10 of the member 8 for continuously adjusting the tension, naturally become spaced apart under the effect of the transmitted couple and of the torsion spring 11, until the belt 5 is tensioned and passes over the largest diameter of the drive pulley 6 because of the approach of the flange 6 to the flange 6A mounted fixedly on the shaft 1. In this position, the input shaft 2 of the reducer 4 turns at high speed.

Figure 5:
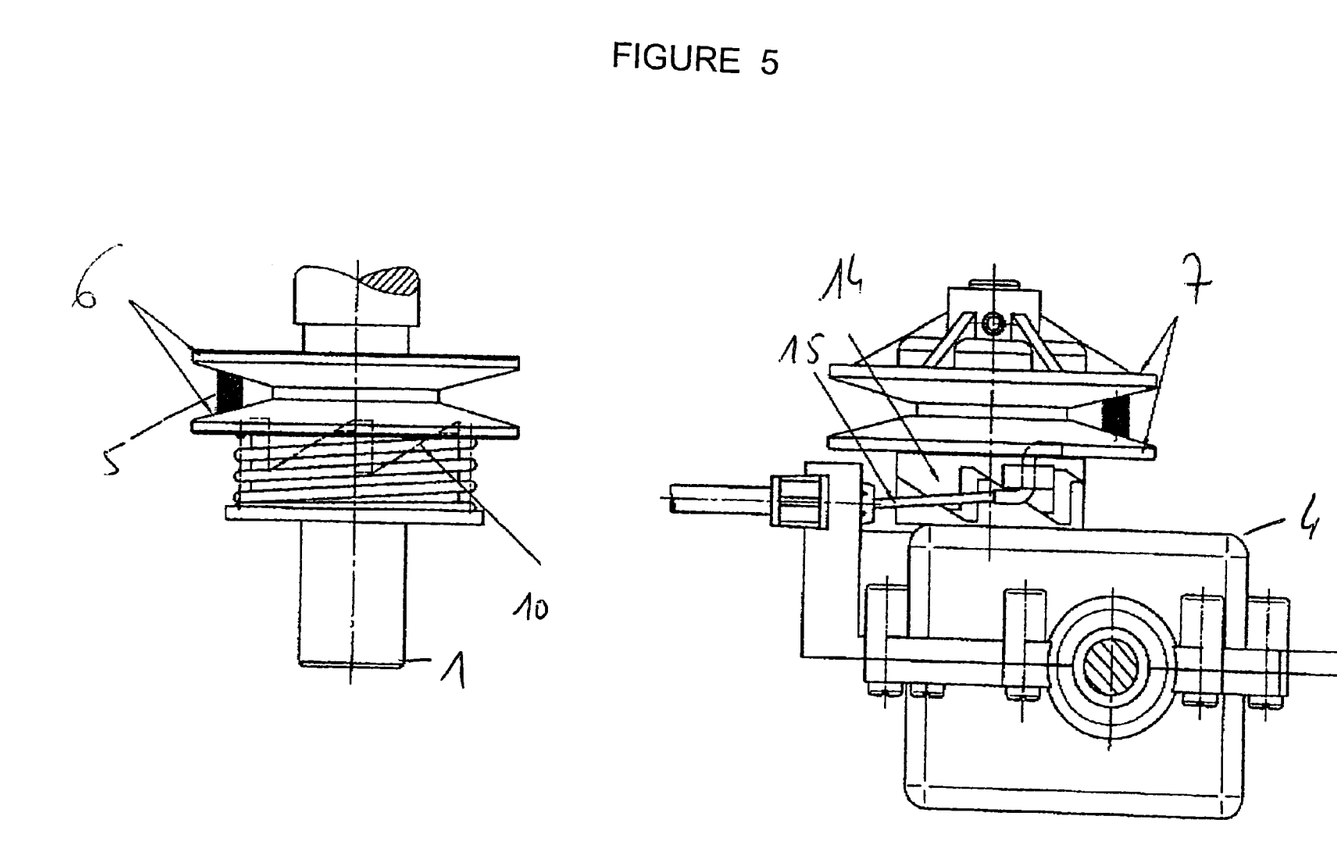

In a second phase, the user pulls on the control cable 15. This results in an angular displacement of the plate 13 in the direction of spacing apart the ramps 14, the plate 13B being fixed. Because of this, the flanges 7A, 7B tend to move toward each other, particularly by movement of the flange 7B in the direction of the flange 7A fixedly mounted on the shaft 2. The belt 5 thus passes over the largest diameter because the internal surfaces of the flanges 7A, 7B or 6A, 6B of the pulleys are generally of trapezoidal shape. On the motor side, the belt 5 passes over a smaller diameter. The tension of the belt 5 is always maintained thanks to the effect of the plates 9A, 9B and the torsion spring 11. The flanges 6A, 6B thus tend to move apart, the ramps of the plates 9A, 9B to move toward each other, and the input shaft 2 of the reducer turns at a medium speed.

Figure 6:
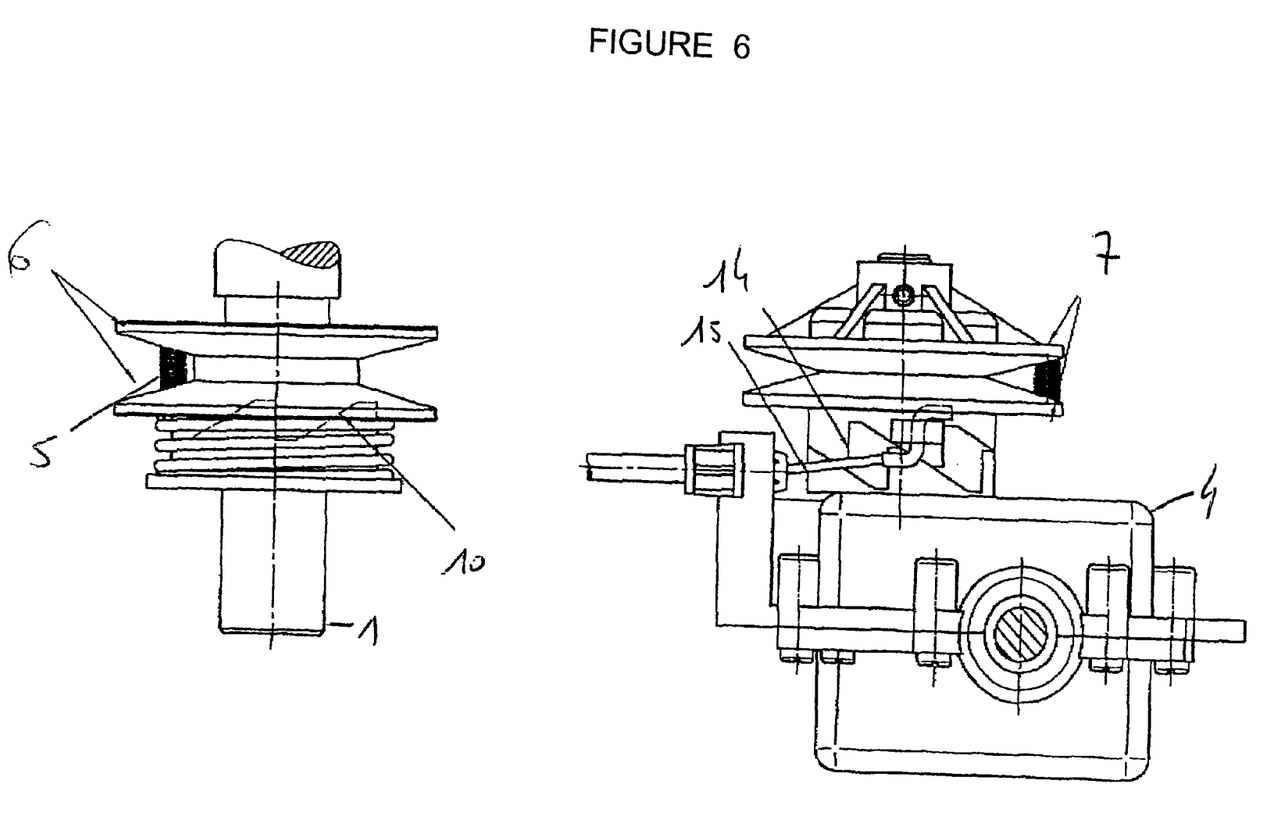

In a third phase, pull on the control cable 15 is continued until the control ramps 14 are spaced apart and the flanges 7A, 7B of the driven pulley are brought into contact. Thus, the belt 5 passes over the largest diameter of the driven pulley 7. On the motor side, the belt 5 passes over the smallest diameter possible of the motor pulley. The tension in the belt is always maintained, thanks to the effect of the plates 9A, 9B and of the tension spring 11. Thus, the flanges 6A, 6B of the motor pulley move apart, the ramps 10 of the plates 9A, 9B tend to move together. The input shaft 2 of the reducer thus turns at a low speed.

The description of operation shows the simplicity of such a transmission whose constituent elements permit obtaining a speed changer of small size, a single belt, perfectly integrable on the one hand into the casing of the reducer, and on the other hand on the blade-carrying motor shaft of a lawnmower, this changer having a wide range of variation.

As shown in the drawings, the adaptation of such a transmission to a lawnmower will be particularly easy because it suffices to house the reducer provided with its driven pulley, within the casing with the mower and to position the motor pulley on the motor shaft that carries the blade of the mower.

What is claimed is:

1. Speed transmission for mowers that are self-propelled with variable speed of advance, between a primary motor shaft (1) that carries the mower blades (17), at constant speed of rotation, and an output shaft (3) of a reducer (4) coupled to the wheels of the mower, this transmission having, upstream of the reducer (4), a speed changer between the primary motor shaft (1) that carries the blades and the input shaft (2) of the reducer (4), characterized in that the speed changer is constituted by a transmission with a belt (5) between a drive pulley (6) adapted to be mounted on the motor shaft (1) that carries the blades and a driven pulley (7) adapted to be mounted on the input shaft (2) of the reducer (4), the drive pulley (6) and the driven pulley (7) each comprising flanges (6A, 6B) (7A, 7B) that are movable toward or away from each other, the movement of the flanges (6A, 6B) of the drive pulley (6) ensuring continuous tensioning of the belt, and being controlled automatically as a function of a couple transmitted between said pulleys by means of a member (8) for the continuous regulation of the tension of the belt (5) positioned adjacent the drive pulley (6) whilst movement of the flanges (7A, 7B) of the driven pulley (7), ensuring speed variation, is controlled manually by means of a control member (12) positioned immediately adjacent the reducer (4) to be isolated from the cutting field of the blade (17) and to be protected from abrasive and clogging projections concentrated in the working zone.

2. Transmission according to claim 1, characterized in that the member (8) for continuous adjustment of the tension in the belt (5) is mounted on the motor shaft (1) and in that the control member (12) of the speed change is mounted on the input shaft (2) of the reducer (4).

3. Transmission according to claim 1, characterized in that the member (8) for continuous control of the tension of the belt (5) has the form of a cam constituted by two coaxial plates (9A, 9B) with inclined ramps (10) in sliding contact, one (9A) of the plates (9A, 9B) being secured in rotation with a flange (6B) of the drive pulley (6), the other plate (9B) being secured to the shaft (1) that carries the blades (17), a torsion spring (11) being interposed between the plates (9A, 9B) and the ramps (10) to return the plates (9A, 9B) and the ramps (10) to a spaced position.

4. Transmission according to claim 3, characterized in that the flange (6B) of the drive pulley (6) and the plate (9A) that carries the ramps (10) fixed in rotation with said flange (6B) are made of a single piece.

5. Transmission according to claim 3, characterized in that a flange (6A) of the drive pulley (6) carries a hub (6C) prolonged axially by fingers (6D) that are resiliently deformable, the hub (6C) receiving within it the flange (6B) of the pulley that carries the ramps (10), the torsion spring (11) and the plate (9B) that carries the ramps associated with the torsion spring (11), the free ends of the fingers (6D) coacting by snap-in engagement with the plate (9B) that carries the ramps (10) to maintain, in the assembled condition on the hub (6C), said elements (6B, 11, 9B), this snap-in being locked by positioning of the hub (6C) on the motor shaft (1).

6. Transmission according to claim 1, characterized in that the member (12) for manual control of the speed change has the form of a cam constituted by two plates (13A, 13B) that are coaxial, with inclined ramps (14) in sliding contact, one (13B) of the plates (13A, 13B) being mounted fixedly relative to the casing of the reducer (4), the other plate (13A) being movable angularly about the input shaft (2) of the reducer (4) by a manual control cable (15) to adjust as desired the speed of rotation of the input shaft (2) of the reducer (4).

7. Transmission according to claim 6, characterized in that the plate (13B) that carries the ramps (10) mounted fixedly relative to the casing of the reducer (4), is constituted by a wall of the casing of the reducer (4) and forms a monolithic assembly with the casing of the reducer.

8. Transmission according to claim 6, characterized in that the plate (13A) that carries the ramps (14) of the control member (12) of the speed changer, movable angularly about the input shaft (2) of the reducer (4), comprises, on the external face of one of the ramps (14), a radial ear (18) within which is fixed one end of the control cable (15).

9. Transmission according to claim 1, characterized in that the flanges (7A, 7B) of the driven pulley (7) are coupled by means of channels (16) permitting relative axial displacement of the flanges (7A, 7B) whilst holding them together in rotation.

10. Mower which is self-propelled with a variable speed of advance, characterized in that it comprises a transmission according to claim 1.

11. The transmission of claim 1, wherein, the speed changer is disposed preferably within a casing.

12. Speed transmission for mowers, comprising:

a primary motor shaft (1) carrying, at constant speed of rotation, a drive pulley (6) and mower blades (17);

a reducer (4) coupled to an input shaft (2) carrying a driven pulley, and including an output shaft (3) coupled to wheels of the mower;

a belt mounted on the drive pulley and on the driven pulley, the drive pulley (6) and the driven pulley (7) each comprising flanges (6A, 6B) (7A, 7B) that are movable toward or away from each other, the movement of the flanges (6A, 6B) of the drive pulley (6) ensuring continuous tensioning of the belt and being controlled automatically as a function of a couple transmitted between said drive and driven pulleys;

a tensioning member (8) for continuous regulation of the tension of the belt (5), the tensioning member being positioned adjacent the drive pulley (6); and a speed changer control member (12) manually controlling movement of the flanges (7A, 7B) of the driven pulley (7), and ensuring speed variation of the output shaft of the reducer, the speed changer control member (12) positioned on the input shaft coupled to the reducer so that the control member is isolated from a cutting field of the blades and protected from abrasive and clogging projections concentrated in a working zone of the blades.

13. Transmission according to claim 12, wherein, the tensioning member (8) is mounted on the motor shaft (1) and the control member (12) is mounted on the input shaft (2), the tensioning member (8) includes a cam comprising two coaxial plates (9A, 9B), each plate with inclined ramps (10) in sliding contact, one (9A) of the plates (9A, 9B) being secured in rotation with a flange (6B) of the drive pulley (6), the other plate (9B) being secured to the motor shaft (1), a torsion spring (11) being interposed between the plates (9A, 9B) and the ramps (10) to return the plates (9A, 9B) and the ramps (10) to a spaced position.

14. Transmission according to claim 13, wherein, the flange (6B) of the drive pulley (6) and the plate (9A) that carries the ramps (10) fixed in rotation with said flange (6B) are made of a single piece, a flange (6A) of the drive pulley (6) carries a hub (6C) prolonged axially by fingers (6D) that are resiliently deformable, the hub (6C) receiving within it the flange (6B) of the pulley that carries the ramps (10), the torsion spring (11) and the plate (9B) that carries the ramps associated with the torsion spring (11), the free ends of the fingers (6D) coacting by snap-in engagement with the plate (9B) that carries the ramps (10) to maintain, in an assembled condition on the hub (6C), said flange, said spring, and said plate that carries the ramps, the snap-in being locked by positioning of the hub (6C) on the motor shaft (1).

15. Transmission according to claim 12, wherein the speed changer control member (12) comprises a cam including two plates (13A, 13B) that are coaxial and each plate includes inclined ramps (14) in sliding contact, one (13B) of the plates (13A, 13B) being mounted fixedly relative to a casing of the reducer (4), the other plate (13A) being movable angularly about the input shaft (2) in response to movement of a manual control cable (15) to adjust as desired the speed of rotation of the input shaft (2) of the reducer (4).

16. Transmission according to claim 15, wherein the plate (13B) that carries the ramps (10) mounted fixedly relative to the casing of the reducer (4), is constituted by a wall of the casing of the reducer (4) and forms a monolithic assembly with the casing of the reducer.

17. Transmission according to claim 16, wherein the plate (13A) that carries the ramps (14) of the control member (12) is movable angularly about the input shaft (2) of the reducer (4), and comprises, on an external face of one of the ramps (14), a radial ear (18) within which is fixed one end of the control cable (15).

18. Transmission according to claim 12, wherein the flanges (7A, 7B) of the driven pulley (7) are coupled by channels (16) permitting relative axial displacement of the flanges (7A, 7B) whilst holding the flanges together in rotation.

19. Speed transmission for mowers, comprising:

a primary motor shaft (1) carrying, at constant speed of rotation, a drive pulley (6) and mower blades (17);

a reducer (4) mounted to an input shaft (2) carrying a driven pulley, the reducer including an output shaft (3) coupled to wheels of the mower;

a belt mounted on the drive pulley and on the driven pulley, the belt driving the driven pulley, the drive pulley (6) and the driven pulley (7) each comprising flanges (6A, 6B) (7A, 7B) that are movable toward or away from each other, the movement of the flanges (6A, 6B) of the drive pulley (6) ensuring continuous tensioning of the belt;

a tensioning member (8) for continuous regulation of the tension of the belt (5), the tensioning member being positioned adjacent the drive pulley (6); and a speed changer control member (12) positioned on the input shaft, the speed changer manually adjustable to control a spacing of the flanges (7A, 7B) of the driven pulley (7), adjustment of the spacing of the flanges providing speed variation of the output shaft of the reducer.

20. Transmission according to claim 19, wherein, the tensioning member (8) is mounted on the motor shaft (1) and the control member (12) is mounted on the input shaft (2), the tensioning member (8) includes a cam comprising two coaxial plates (9A, 9B), each plate with inclined ramps (10) in sliding contact, one (9A) of the plates (9A, 9B) being secured in rotation with a flange (6B) of the drive pulley (6), the other plate (9B) being secured to the motor shaft (1), a torsion spring (11) being interposed between the plates (9A, 9B) and the ramps (10) to return the plates (9A, 9B) and the ramps (10) to a spaced position, a flange (6A) of the drive pulley (6) carries a hub (6C) prolonged axially by fingers (6D) that are resiliently deformable, the hub (6C) receiving within it the flange (6B) of the pulley that carries the ramps (10), the torsion spring (11) and the plate (9B) that carries the ramps associated with the torsion spring (11), the free ends of the fingers (6D) coacting by snap-in engagement with the plate (9B) that carries the ramps (10) to maintain, in an assembled condition on the hub (6C), said flange, said spring, and said plate that carries the ramps, the snap-in being locked by positioning of the hub (6C) on the motor shaft (1), the speed changer control member (12) comprises a cam including two plates (13A, 13B) that are coaxial and each plate includes inclined ramps (14) in sliding contact, one (13B) of the plates (13A, 13B) being mounted fixedly relative to a casing of the reducer (4), the other plate (13A) being movable angularly about the input shaft (2) in response to movement of a manual control cable (15) to adjust as desired the speed of rotation of the input shaft (2) of the reducer (4), and the plate (13A) that carries the ramps (14) of the control member (12) is movable angularly about the input shaft (2) of the reducer (4), and comprises, on an external face of one of the ramps (14), a radial ear (18) within which is fixed one end of the control cable (15).

* * * * *